(12) United States Patent
Shimizu

(10) Patent No.: US 7,411,616 B2
(45) Date of Patent: Aug. 12, 2008

(54) EXPOSURE CONTROLLER FOR CAMERA ATTACHED TO ELECTRONIC EQUIPMENT

(75) Inventor: Shuji Shimizu, Kanagawa (JP)

(73) Assignee: Sony Corporaton (JP)

( * ) Notice: Subject to any disclaimer, the term of this patent is extended or adjusted under 35 U.S.C. 154(b) by 669 days.

(21) Appl. No.: 11/102,153

(22) Filed: Apr. 8, 2005

(65) Prior Publication Data

US 2005/0174472 A1  Aug. 11, 2005

Related U.S. Application Data

(63) Continuation of application No. 10/120,692, filed on Apr. 11, 2002, now Pat. No. 6,912,006.

(30) Foreign Application Priority Data

Jun. 28, 2000  (JP)  ............... P2000-194863
Apr. 16, 2001  (JP)  ............... P2001-116760

(51) Int. Cl.
   *H04N 5/235*  (2006.01)
(52) U.S. Cl. .............. 348/229.1; 348/241; 348/255; 348/364; 348/302; 348/308
(58) Field of Classification Search ......... 348/362–365, 348/369, 221.1, 224.1, 373, 241
   See application file for complete search history.

(56) References Cited

U.S. PATENT DOCUMENTS

| 4,364,650 | A | * | 12/1982 | Terashita et al. ............ 396/234 |
| 5,128,769 | A |   | 7/1992  | Arai et al. |
| 5,631,699 | A | * | 5/1997  | Saito ...................... 348/211.6 |
| 5,768,163 | A |   | 6/1998  | Smith, II |
| 5,880,783 | A |   | 3/1999  | Ma et al. |
| 6,141,052 | A |   | 10/2000 | Fukumitsu et al. |
| 6,229,569 | B1 |  | 5/2001  | Saito et al. |
| 6,323,902 | B1 |  | 11/2001 | Ishikawa et al. |
| 6,462,781 | B1 |  | 10/2002 | Arnold |
| 6,540,415 | B1 |  | 4/2003  | Slatter et al. |
| 6,587,151 | B1 |  | 7/2003  | Cipolla et al. |
| 6,611,284 | B2 |  | 8/2003  | Lourie et al. |
| 6,731,340 | B1 |  | 5/2004  | Lai et al. |
| 6,845,954 | B1 |  | 1/2005  | Moayer et al. |
| 6,912,006 | B2 | * | 6/2005  | Shimizu ...................... 348/364 |
| 2001/0010550 | A1 | | 8/2001 | Saito et al. |

(Continued)

*Primary Examiner*—Ngoc-Yen T. Vu
*Assistant Examiner*—David Holt
(74) *Attorney, Agent, or Firm*—Lerner, David, Littenberg, Krumholz & Mentlik, LLP (57) ABSTRACT

A photographic image is divided into a central area and a surrounding area, and video signals for the central and surrounding areas are integrated by an area integrator circuit. When an operator of video camera attached to a notebook personal computer is to photograph himself/herself with an imager of the video camera pointing toward the operator, a control microcomputer causes the integration result for the former to be multiplied by a larger weighting before both are summed. The control microcomputer generates exposure information according to the result, and compares the exposure level indicated by this information with the reference level to control an electronic shutter of an imaging device and the gain of an amplifier circuit so that the exposure level matches the reference level. Thus, the exposure of the video camera can be adjusted to an appropriate level. If the imager points towards an object on the opposite side of the operator, exposure control is performed as usual.

1 Claim, 6 Drawing Sheets

U.S. PATENT DOCUMENTS

2001/0050720 A1 12/2001 Karube et al.
2002/0158987 A1 10/2002 Shimizu
2004/0105028 A1 6/2004 Watanabe

* cited by examiner

EXPOSURE CONTROLLER FOR CAMERA ATTACHED TO ELECTRONIC EQUIPMENT

This is a continuation of prior application Ser. No. 10/120,692 filed Apr. 11, 2002, now U.S. Pat. No. 6,912,006.

BACKGROUND OF THE INVENTION

1. Field of the Invention

The present invention relates to an apparatus for controlling the exposure of an electronic camera mounted on electronic equipment such as portable information terminal devices.

2. Description of the Related Art

Some electronic devices called portable information terminal devices, such as notebook personal computers and PDAs (personal digital assistants), are equipped with a video camera for capturing images of an operator of the electronic device or images of other objects and for displaying the images on a display screen of the electronic device. In such electronic devices, typically, an imager of the video camera is attached to an upper portion of a display so that the camera can be rotated in a plane orthogonal to the screen. The imager may be rotated as desired in order to photograph the operator of the electronic device or an object located on the opposite side of the electronic device. The electronic devices further include an exposure controller for the video camera for detecting the brightness of a captured image to automatically control the video camera to an appropriate exposure level.

Generally, outdoor photography often produces a backlighting problem because the sky is included in an upper portion of a photographic image, while indoor photography often produces an excessive front lighting problem because a ceiling light is included in an upper portion of a photographic image. A typical approach to photograph an object in a manner as real as possible during such conditions is to divide a single photographic image into an upper area and a lower area for exposure control so that the brightness detected in the lower area is more strongly reflected.

If the operator of the electronic device captures an image of himself/herself indoors with the imager of the video camera pointing towards the operator, however, a window or a light may often be behind the operator at an upper portion or a side portion in the image, thus causing a backlighting or excessive front lighting problem. In this case, the above-noted approach to detect the brightness in the upper and lower areas into which a photographic image is divided does not provide accurate exposure control, resulting in dim photography of the operator to produce an obscure image.

SUMMARY OF THE INVENTION

Accordingly, it is an object of the present invention to provide an exposure controller for a camera attached to electronic equipment which is capable of accurately accommodating photography during backlighting or excessive front lighting even when the operator of the electronic equipment is photographed.

To this end, the present invention provides an exposure controller for an electronic camera which is detachably attached and connected to electronic equipment having a display and which controls the exposure of the electronic camera of which the photographic coverage is capable of being set at at least the front or rear of the display. The exposure controller includes: an exposure detector for, in response to a video signal generated by the electronic camera, generating exposure detection information indicating the mean magnitude of the video signal for a single photographic image; an exposure adjuster for adjusting the exposure of the electronic camera according to the exposure detection information generated by the exposure detector; and a photographic coverage detector which outputs a coverage detection signal when the photographic coverage of the electronic camera is set at the rear of the screen. The exposure detector virtually divides the single photographic image using a first pattern and a second pattern. In the first pattern, the photographic image is divided into an upper area and a lower area, and first exposure detection information indicating that the magnitude of the video signal corresponding to the lower area is more strongly reflected is generated. In the second pattern, the photographic image is divided into a central area and a surrounding area, and second exposure detection information indicating that the magnitude of the video signal corresponding to the central area is more strongly reflected is generated. The exposure adjuster adjusts the exposure of the electronic camera according to the first exposure detection information when the photographic coverage detector outputs the coverage detection signal, and according to the second exposure detection information when the photographic coverage detector does not output the coverage detection signal.

According to the present invention, therefore, the exposure detector may virtually divide a single photographic image using a first pattern or a second pattern. In the first pattern, the photographic image may be divided into an upper area and a lower area, and the exposure detector may generate first exposure detection information indicating that the magnitude of the video signal for the lower area is relatively strongly reflected. In the second pattern, the photographic image may be divided into a central area and a surrounding area, and the exposure detector may generate second exposure detection information indicating that the magnitude of the video signal for the central area is relatively strongly reflected. The exposure adjuster may adjust the exposure of the electronic camera according to the first exposure detection information when the photographic coverage detector outputs the detection signal, and may adjust the exposure of the electronic camera according to the second exposure detection information when the photographic coverage detector does not output the detection signal.

Therefore, if an operator of the electronic equipment is photographed during backlighting or excessive front lighting whereby a window or a light might be behind the operator at an upper portion or a side portion of the photographic image or whereby a brighter object might be included at a lower portion of the photographic image, the exposure of the electronic camera can be adjusted according to the second exposure detection information in which the brightness in the central area of the photographic image is relatively strongly reflected, thereby allowing an image of the operator to be sharply captured with an appropriate exposure level.

DESCRIPTION OF THE PREFERRED EMBODIMENTS

Some embodiments of the present invention will now be described with reference to the accompanying drawings.

Figure 1:
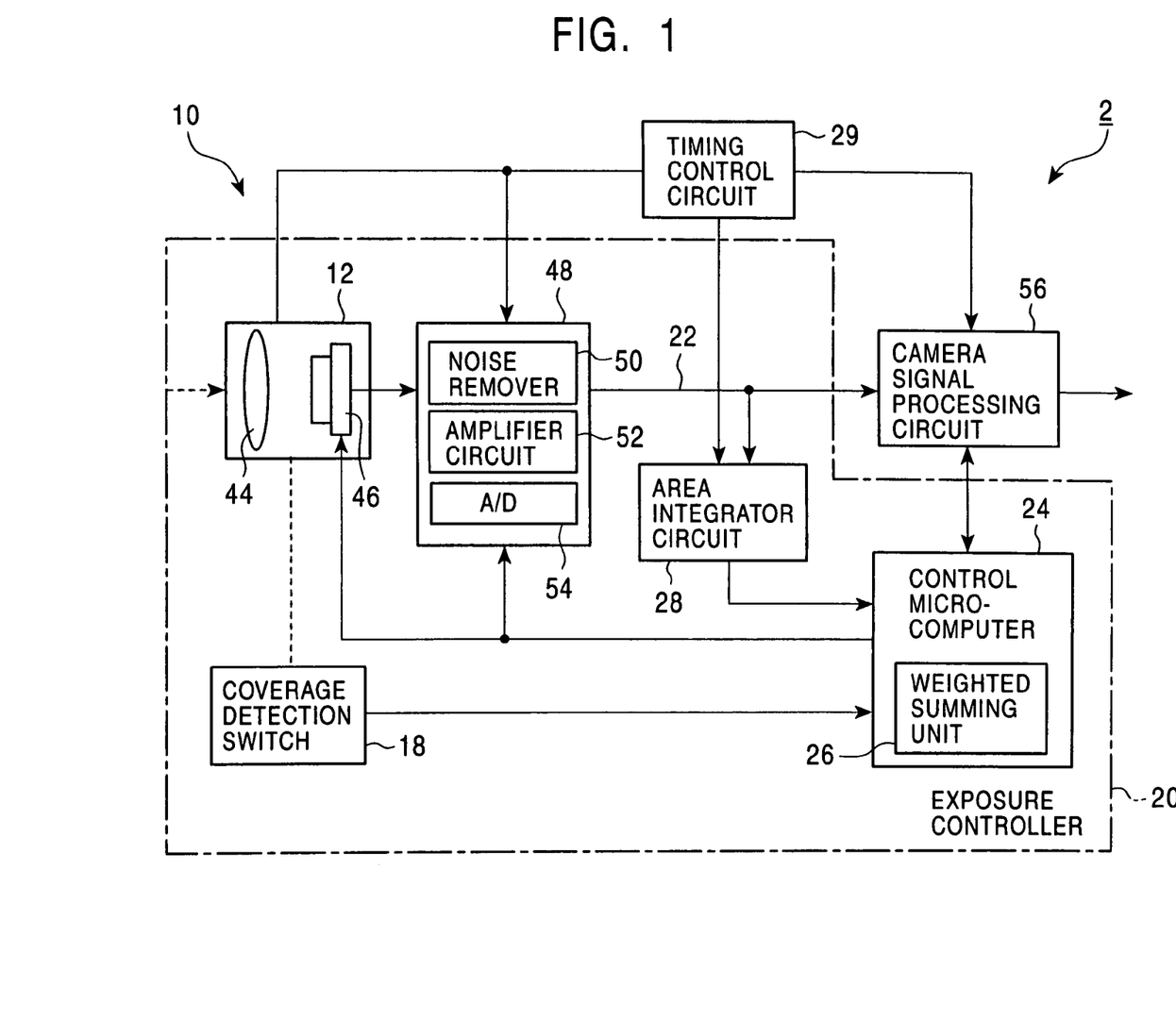
FIG. 1 is a block diagram of a video camera in a notebook personal computer, including an exposure controller for a camera attached to electronic equipment according to a first embodiment of the present invention.
Figure 2:
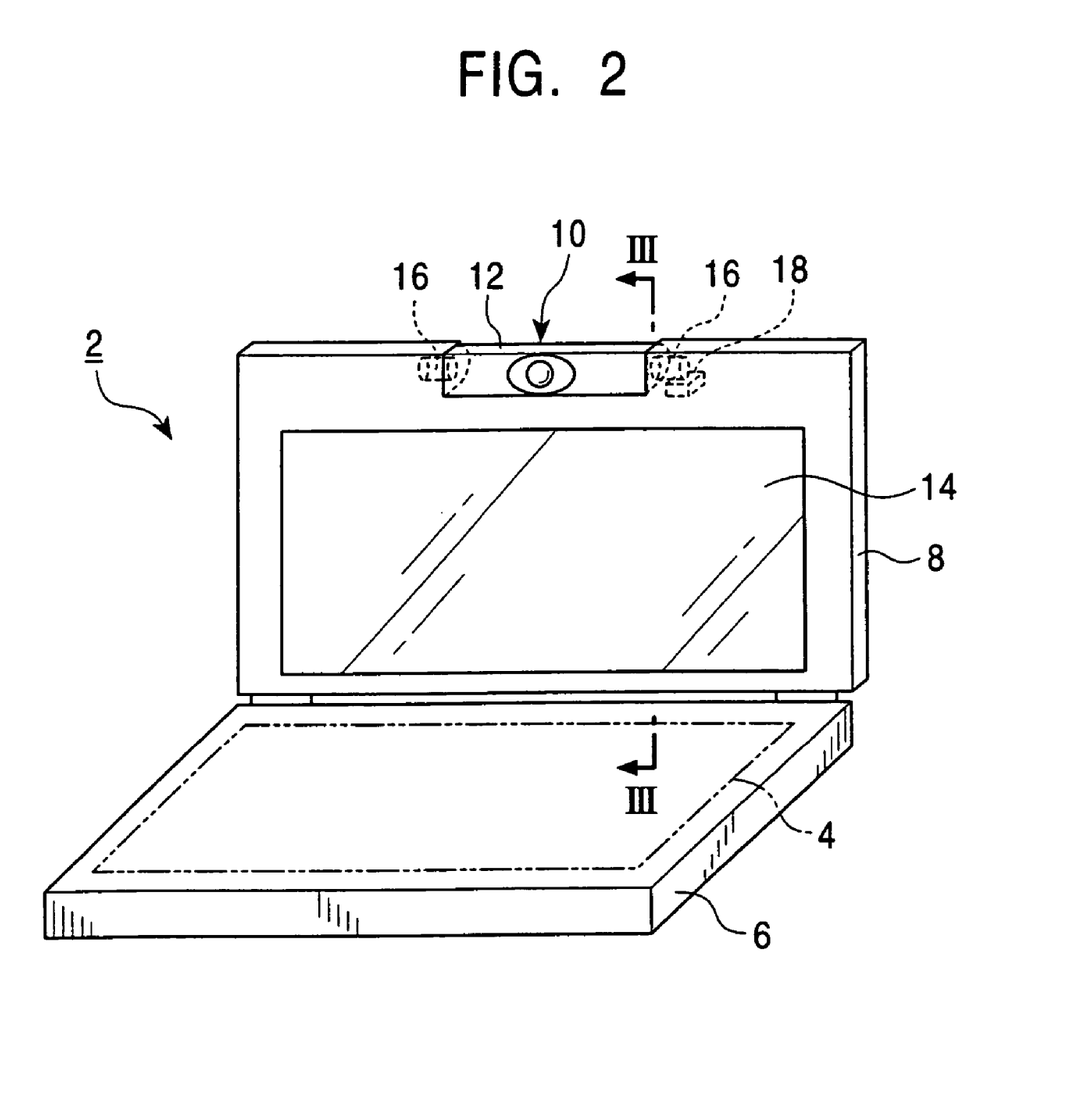
FIG. 2 is a perspective view of the notebook personal computer which includes the exposure controller according to the first embodiment of the present invention.
Figure 3:
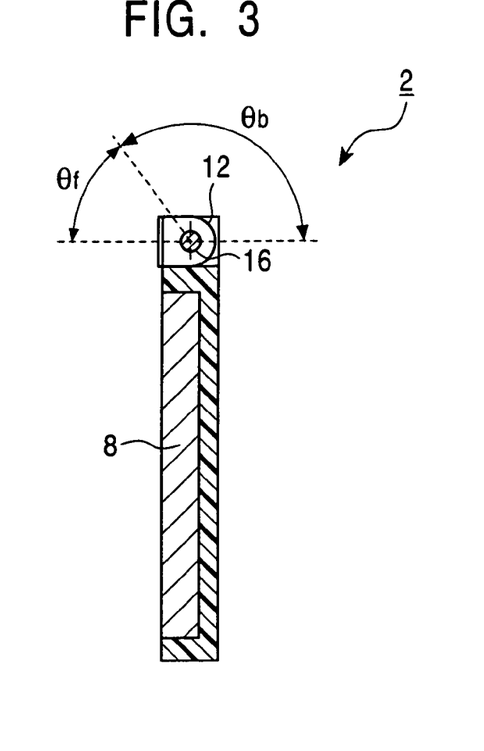
FIG. 3 is a side view of the notebook personal computer in cross-section, taken along a line III-III in FIG. 2.
Figure 4:
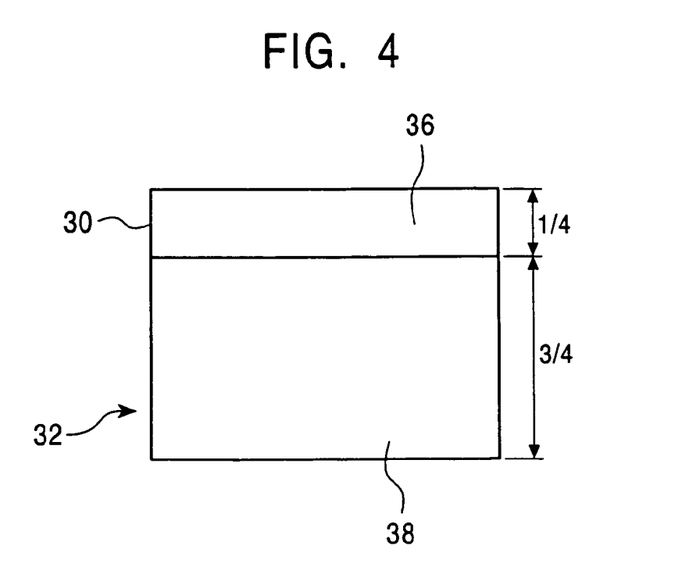
FIG. 4 is a diagram of a photographic image which is divided using a first pattern.
Figure 5:
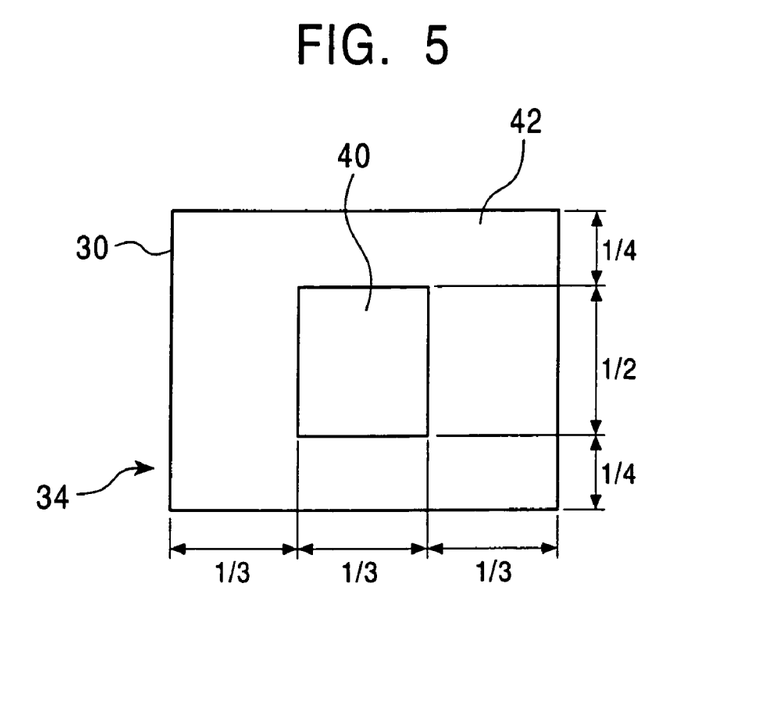
FIG. 5 is a diagram of a photographic image which is divided using a second pattern.

FIG. 1 is a block diagram of a video camera 10 in a notebook personal computer 2, including an exposure controller 20 for a camera attached to electronic equipment according to a first embodiment of the present invention. FIG. 2 is a perspective view of the notebook personal computer 2 which includes the exposure controller 20 according to the first embodiment, and FIG. 3 is a side view of the notebook personal computer 2 in cross-section, taken along a line III-III in FIG. 2. FIG. 4 is a diagram of a photographic image which is divided using a first pattern 32, and FIG. 5 is a diagram of a photographic image which is divided using a second pattern 34.

The notebook personal computer 2 (electronic equipment) illustrated in FIGS. 2 and 3 includes a body 6 having a keyboard 4 formed on the upper surface thereof, and a display 8, which are pivotably coupled with each other. An imager 12 of the video camera 10 which is an electronic camera is mounted on the center of the bezel above a screen 14 of the display 8. The imager 12 is supported at both ends by hinges 16 so that the imager 12 can be rotated in a plane which is orthogonal to the screen 14 and which extends lengthwise. Thus, the photographic coverage of the imager 12 can be set at the front of the screen 14 (to photograph the operator of the notebook computer) or at the rear of the screen 14.

As shown in FIG. 2, a coverage detection switch 18 having a photographic coverage detection feature is near one hinge 16. When the imager 12 is rotated to set the photographic coverage at substantially the rear of the screen 14, the coverage detection switch 18 is enabled to output a predetermined coverage detection signal. More specifically, as shown in FIG. 3, in the first embodiment, if the photographic coverage of the imager 12 ranges more than about 60° from the front to the rear of the screen 14, the coverage detection switch 18 outputs the coverage detection signal. Thus, the coverage detection switch 18 does not output the coverage detection signal if the photographic coverage of the imager 12 is within the range θf (60°) shown in FIG. 3, and outputs the coverage detection signal if the photographic coverage is within the range θb.

As shown in FIG. 1, the exposure controller 20 according to the first embodiment which is incorporated into the notebook personal computer 2 includes the imager 12, the coverage detection switch 18, an area integrator circuit 28, and a control microcomputer 24.

The control microcomputer 24 has a function of a weighted summing unit 26 in accordance with the present invention, and the weighted summing unit 26 and the area integrator circuit 28 serve as an exposure detector in accordance with the present invention. In response to a video signal 22 created by the video camera 10, the exposure detector generates exposure detection information indicating the mean magnitude of the video signal 22 for one photographic image.

Specifically, the exposure detector virtually divides a single photographic image 30 using the first pattern 32 and the second pattern 34 as shown in FIGS. 4 and 5, respectively. In the first pattern 32, the photographic image 30 is divided into an upper area 36 and a lower area 38, and first exposure detection information is generated in which the magnitude of the video signal 22 corresponding to the lower area 38 is relatively strongly reflected. In the second pattern 34, the photographic image 30 is divided into a central area 40 and a surrounding area 42, and second exposure detection information is generated in which the magnitude of the video signal 22 corresponding to the central area 40 is relatively strongly reflected.

More specifically, the area integrator circuit 28 of the exposure detector integrates the video signal 22 corresponding to each of the divided areas in the first and second patterns 32 and 34, and outputs the signal indicating the result to the control microcomputer 24. The weighted summing unit 26 then multiplies the integration results for the areas which are output by the area integrator circuit 28 by weightings for the respective areas, and sums the results to generate first and second exposure detection information.

The exposure controller 20 further has an exposure adjuster including the control microcomputer 24, an electronic shutter of the imager 12 and an amplifier circuit, as described below. The exposure adjuster adjusts the exposure of the video camera 10 according to the exposure detection information generated by the weighted summing unit 26.

Specifically, the exposure adjuster adjusts the exposure of the video camera 10 according to the first exposure detection information when the coverage detection switch 18 outputs the coverage detection signal, and adjusts the exposure of the video camera 10 according to the second exposure detection information when the coverage detection switch 18 does not output the coverage detection signal.

The imager 12 of the video camera 10 includes a lens 44 and an imaging device 46 such as a CCD (charge coupled device). The imaging device 46 has an electronic shutter mechanism, and controls the electronic shutter according to a control signal from the control microcomputer 24 to adjust the exposure of the imager 12, and therefore the video camera 10.

The signal from the imaging device 46 of the imager 12 is input to a signal processing circuit 48, in which the signal is passed through a noise removing circuit 50, an amplifier circuit 52, and an analog-to-digital (A/D) converter circuit 54, and is then output as a digital video signal 22. The resulting video signal 22 is input to the area integrator circuit 28, and is also input to a camera signal processing circuit 56. In the camera signal processing circuit 56, the video signal 22 is processed with horizontal or vertical image inversion under the control of the control microcomputer 24.

The amplifier circuit 52 is a variable gain amplifier whose gain is adjusted according to a control signal from the control microcomputer 24. When the gain of the amplifier circuit 52 is adjusted, the amplitude of the video signal 22 changes to cause variations in brightness of the photographic image 30. Thus, equivalently, the exposure of the video camera 10 can be adjusted.

A timing control circuit 29 supplies a timing signal such as a vertical synchronization signal or a horizontal synchronization signal to the imager 12, the signal processing circuit 48, the area integrator circuit 28, and the camera signal processing circuit 56, and these components operate according to the timing signal. In particular, the area integrator circuit 28 specifies each of the above-described areas according to each synchronization signal to integrate the video signal corresponding to each area.

The operation of the thus constructed exposure controller 20 for a camera attached to electronic equipment is now described.

When an operator of the notebook personal computer 2 rotates the imager 12 in order to capture an image of an object other than the operator, and sets the photographic coverage of the imager 12 in the range θb shown in FIG. 3, the coverage detection switch 18 is enabled to output the coverage detection signal to the control microcomputer 24.

The signal generated by the imager 12 capturing an image of the object is processed by the signal processing circuit 48, and is then input to both the area integrator circuit 28 and the camera signal processing circuit 56 as a video signal 22. In this case, since the coverage detection switch 18 outputs the coverage detection signal, the control microcomputer 24 instructs the camera signal processing circuit 56 to perform processing. In response, the camera signal processing circuit 56 applies horizontal or vertical image inversion to the video signal 22. This causes a vertically inverted image, which is associated with the rotation of the imager 12, to be corrected to display a properly oriented image according to the video signal output by the camera signal processing circuit 56.

The area integrator circuit 28 virtually divides the single photographic image 30 using the first and second patterns 32 and 34, as shown in FIGS. 4 and 5, respectively. Thereafter, the video signals 22 corresponding to the upper area 36 and the lower area 38 in the first pattern 32 are integrated, while the video signals 22 corresponding to the central area 40 and the surrounding area 42 in the second pattern 33 are integrated. The imager 12 performs vertical scanning in a period of, for example, approximately 1/30 second, and the video signals 22 for the photographic image 30 are also generated approximately every 1/30 second. Thus, the area integrator circuit 28 integrates the video signal 22 for each of those areas using the video signal 22 in this period.

Upon receipt of the integration results, the control microcomputer 24 operates as the weighted summing unit 26. Since the coverage detection switch 18 outputs the coverage detection signal in this case, as usual, the integration result of the video signal 22 corresponding to the upper area 36 is multiplied by a relatively small weighting, and the integration result of the video signal 22 corresponding to the lower area 38 is multiplied by a relatively large weighting, and the resulting signals are summed to generate first exposure information.

Then, the control microcomputer 24 compares the exposure level indicated by the first exposure information with the reference level, and controls the electronic shutter and the gain of the amplifier circuit 52 so that the exposure level indicated by the first exposure information matches the reference level. Thus, the exposure of the video camera 10 can be adjusted to an appropriate level.

When an operator of the notebook personal computer 2 rotates the imager 12 in order to capture an image of himself/ herself, and sets the photographic coverage of the imager 12 in the range θf shown in FIG. 3, the coverage detection switch 18 is not enabled, and no coverage detection signal is output. Therefore, the control microcomputer 24 does not issue an instruction to the camera signal processing circuit 56, and the camera signal processing circuit 56 outputs the video signal 22 from the signal processing circuit 48 without change.

The area integrator circuit 28 performs the same processing as above described, and outputs the integration result of the video signal 22 for each area. Upon reception of the integration result, the control microcomputer 24 operates as the weighted summing unit 26. However, since the coverage detection switch 18 does not output the coverage detection signal in this case, the integration result of the video signal 22 corresponding to the central area 40 is multiplied by a relatively large weighting, and the integration result of the video signal 22 corresponding to the surrounding area 42 is multiplied by a relatively small weighting, and the resulting signals are summed to generate second exposure information.

Then, the control microcomputer 24 compares the exposure level indicated by the second exposure information with the reference level, and controls the electronic shutter and the gain of the amplifier circuit 52 so that the exposure level indicated by the second exposure information matches the reference level. Thus, the exposure of the video camera 10 can be adjusted to an appropriate level.

In the first embodiment, therefore, if an operator of the electronic device is photographed, the integration result of the video signal 22 corresponding to the central area 40 is multiplied by a relatively large weighting, and the second exposure information indicates that the brightness in the central portion of the image is more strongly reflected. Therefore, if the operator is photographed during backlighting or excessive front lighting whereby a window or a light might be behind the operator in a photographic image or whereby a brighter object might be included at a lower portion of the photographic image, the exposure of the video camera 10 can be adjusted according to the second exposure information in the above-described way. Thus, an image of the operator can be sharply captured with an appropriate exposure level.

A notebook personal computer equipped with such a video camera may be used for the purpose of personal computer video conferencing, for example. The exposure controller 20 according to the first embodiment, which is mounted on such a notebook personal computer, would be more suitable for personal computer video conferencing because it provides sharp video with an optimal exposure level regardless of the photographic environment.

Figure 6:
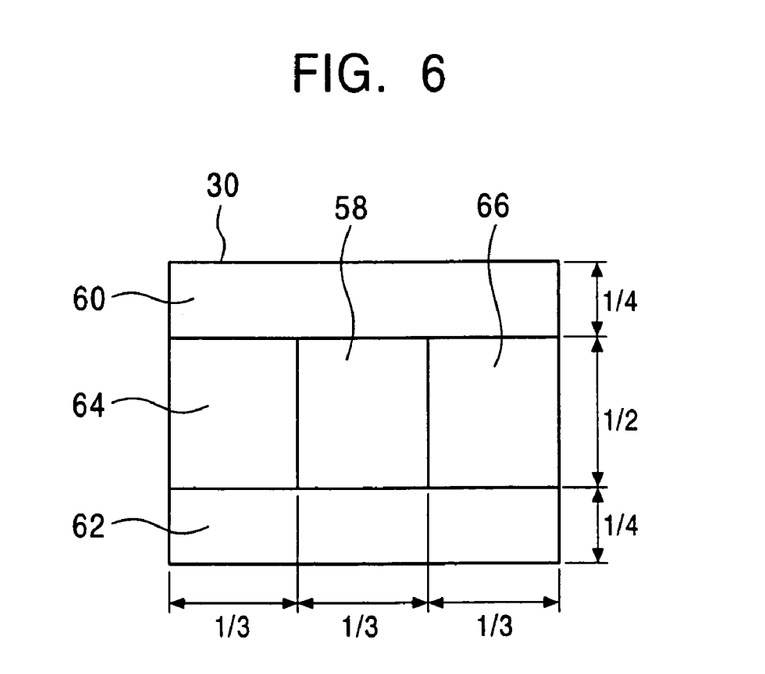
FIG. 6 is a diagram of a photographic image which is divided using another pattern.

The photographic image need not be divided into the central area 40 and the surrounding area 42 as shown in FIG. 5, but may be divided into five areas, namely, a central area 58, an upper area 60, a lower area 62, and side areas 64 and 66, as shown in FIG. 6. In this case, a weighting can be set in more detail for each area, thereby achieving more effective exposure control. Furthermore, a different weighting for each area in the above-described pattern may be useful to accommodate the case where an object other than an operator of electronic equipment is photographed.

The electronic camera described herein may be a digital still camera in place of the video camera 10. A digital still camera incorporating the present invention would also achieve the same advantages.

A second embodiment of the present invention is now described.

Figure 7:
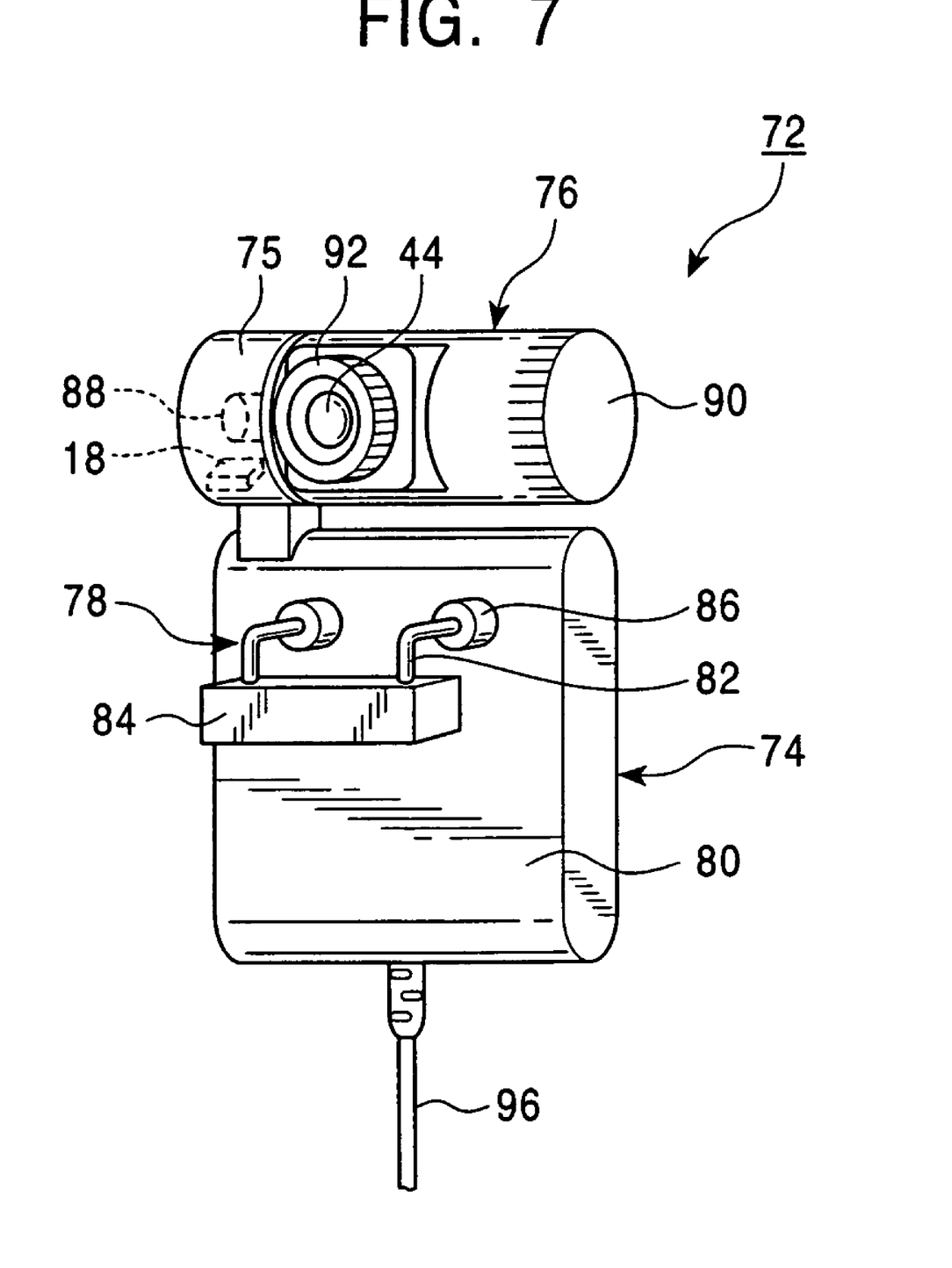
FIG. 7 is a perspective view of an electronic camera which is controlled by an exposure controller according to a second embodiment of the present invention.
Figure 8:
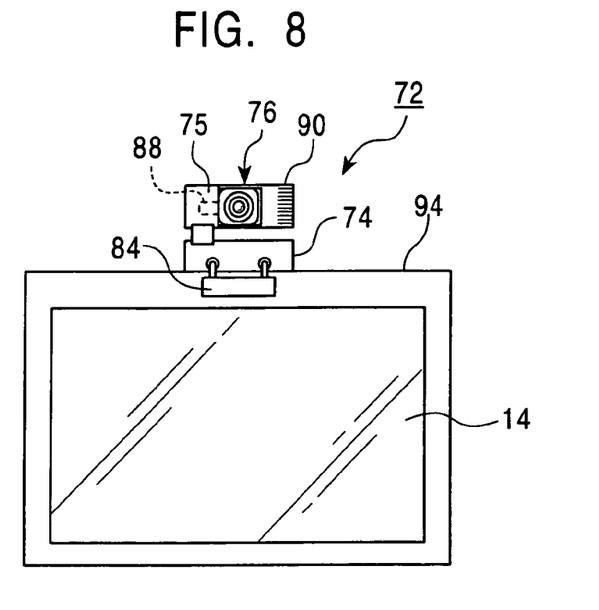
FIG. 8 is a front elevational view of the electronic camera which is controlled by the exposure controller according to the second embodiment.
Figure 9:
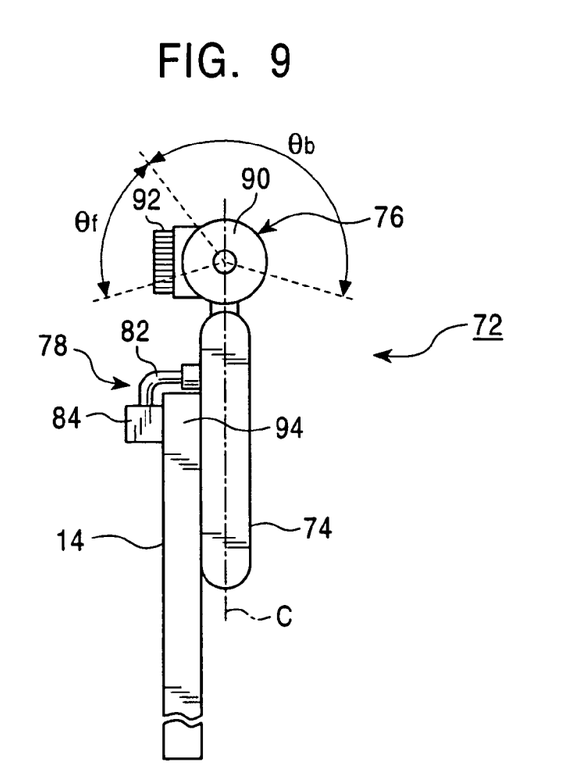
FIG. 9 is a side view of the electronic camera which is controlled by the exposure controller according to the second embodiment.

FIG. 7 is a perspective view of an electronic camera controlled by an exposure controller according to a second embodiment of the present invention, FIG. 8 is a front elevational view of the electronic camera, and FIG. 9 is a side view of the electronic camera. Through FIGS. 7 to 9, the same reference numerals are given to the same components as those in FIGS. 2 and 3.

The second embodiment is different from the first embodiment in that a video camera 72 as the electronic camera is detachably attached to a notebook personal computer. In the following description, this point is particularly focused on.

As shown in FIGS. 7 to 9, the video camera 72 includes a camera body 74, a camera head 76 attached to the top of the camera body 74, and a hook 78.

The hook 78 includes two arms 82 extending from a side surface 80 of the camera body 74, and a push unit 84. The proximal ends of the arms 82 are supported by supports 86 of the camera body 74 in a retractable manner. The arms 82 are inserted into the camera body 74, and are urged to the inside of the camera body 74 by springs (not shown) located within the camera body 74. The distal ends of the arms 82 are bent downward, and the push unit 84 is attached to the distal ends of the arms 82.

The camera head 76 includes a part 75 fixed to the camera body 74, and a rotatable part 90 which is rotatably supported by the fixed part 75 through a hinge 88. The rotatable part 90 is rotatably moved about an imaginary line parallel to the direction in which the arms 82 are aligned. In this example, the rotatable part 90 is rotatable in a range of up to approximately 210°. The rotatable part 90 includes an imaging device such as a CCD, a lens 44 which is located in front of the imaging device, and a focus ring 92 for adjusting the focusing.

The fixed part 75 of the camera head 76 includes the coverage detection switch 18 near the hinge 88. When the rotatable part 90 of the camera head 76 is rotated to set the photographic coverage at substantially the rear of the screen 14, the coverage detection switch 18 is enabled to output a predetermined coverage detection signal.

The rotation angle of the rotatable part 90 ranges to approximately 105° at each of the front and rear side with respect to the center line C of both the camera head 76 and the camera body 74, as shown in FIG. 9. When the rotatable part 90 is within the range θb which is from 30° at the front side, that is, the side of the arms 82, to 105° at the rear side with respect to the center line C, the coverage detection switch 18 is enabled to output the coverage detection signal. When the rotatable part 90 is within the range θf which is from 30° to 105° at the front side with respect to the center line C, the coverage detection switch 18 does not output the coverage detection signal.

The camera body 74 contains a circuit board (not shown) on which circuits corresponding to the signal processing circuit 48, the area integrator circuit 28, the control microcomputer 24, the camera signal processing circuit 56, and the timing control circuit 29 shown in FIG. 1 are mounted to constitute circuits of the exposure controller. The feature and operation of the circuits have been described in detail, and are not described herein.

When the video camera 72 is attached to a personal computer, the push unit 84 of the hook 78 is pinched with human fingers to put the arms 82 of the hook 78 apart from the camera body 74, as appropriate, so that the distance between the push unit 84 and the camera body 74 is widened, and is then released from the fingers while the bezel 94 above the screen 14 of the personal computer is caught by the arms 82. The arms 82 are still urged in the manner as described above, causing the bezel 94 of the screen 14 to be held between the camera body 74 and the push unit 84 so that the video camera 72 can be fixedly attached to the top of the screen 14.

The photographic result of the video camera 72 is transmitted to the personal computer via a USB (universal serial bus) cable 96, and is displayed on the screen 14 as desired. If the operator rotates the rotatable part 90 within the range θb, the coverage detection switch 18 (FIG. 7) outputs the coverage detection signal, and a photographic image is divided using the first pattern 32 (see FIG. 4) as in the first embodiment to generate exposure information. The electronic shutter of the imaging device and the amplifier circuit are controlled according to the exposure information to adjust the exposure of the video camera 72 to an optimal level.

If the operator rotates the rotatable part 90 within the range θf, the coverage detection switch 18 does not output the coverage detection signal, and a photographic image is divided using the second pattern 34 (see FIG. 5) as in the first embodiment to generate exposure information. The electronic shutter of the imaging device and the amplifier circuit are controlled according to this exposure information to adjust the exposure of the video camera 72 to an optimal level.

Accordingly, the video camera 72 which is detachably attached to the personal computer would have the same advantages as those in the first embodiment.

Such a detachably attached electronic camera may be a digital still camera in place of the video camera 72. A digital still camera incorporating the present invention would also achieve the same advantages.

While the USB cable 96 is used to connect the video camera 72 to the personal computer in the second embodiment, other types of interfaces may be used.

A detachably attached electronic camera in the second embodiment may be used while the electronic camera is not attached to electronic equipment. In this application, the electronic camera may be freely located. Thus, if the rotatable part 90 is within the range θf, an object may not be the operator of the electronic equipment, or, otherwise, if the rotatable part 90 is within the range θb, an object may be the operator of the electronic equipment. Therefore, a mechanism which allows a control signal corresponding to the coverage detection signal to be supplied to the electronic camera according to operation of the operator from the electronic equipment side and which allows for switching between the first and second patterns to divide a photographic image may be available. This enables the operator to switch a pattern which is used to divide a photographic image when the electronic camera is not attached to the electronic equipment, thereby achieving appropriate exposure control.

If the photographic image 30 is divided into the central area 40 and the surrounding area 42 as shown in FIG. 5, the central area 40 may be rectangular with the height being, for example, about one half of the height of the photographic image 30 and the width being, for example, about one third of the width of the photographic image 30 so that the dimension of the area integrator circuit 28 can be reduced. Then, desired exposure control is achieved when the operator is photographed.

For example, the integration result of the video signal 22 for the central area 40 and the integration result of the video signal 22 for the surrounding area 42 may be multiplied by a weighting ratio of 90 to 10 out of 100, thus achieving desired result.

If the photographic image 30 is divided into the upper area 36 and the lower area 38 as shown in FIG. 4, the upper area 36 may account for, for example, approximately an upper quarter of the photographic image 30. Then, desired exposure control is achieved when a general object is photographed.

For example, the integration result of the video signal 22 for the upper area 36 and the integration result of the video signal 22 for the lower area 38 may be multiplied by a weighting ratio of 10 to 90 out of 100, thus achieving desired result.

If the photographic image 30 is divided into the five areas as shown in FIG. 6, the central area 58 may be rectangular with the height being, for example, about one half of the height of the photographic image 30 and the width being, for example, about one third of the width of the photographic image 30, while the upper area 60 and the lower area 62 account for, for example, approximately an upper quarter and a lower quarter of the photographic image 30, respectively. Then, desired exposure control is achieved when the operator is photographed.

For example, the integration results of the video signals 22 for the central area 58, the upper area 60, the lower area 62, and the side areas 64 and 66 may be multiplied by a weighting ratio of 60 to 5 to 5 to 15 to 15 out of 100 when the operator is photographed, and by a weighting ration of 25 to 5 to 20 to 25 to 25 when an object other than the operator is photographed, thus achieving desired result.

What is claimed is:

1. An exposure controller for an electronic camera that is detachably attached and connected to electronic equipment having a display and that controls an exposure of the electronic camera of which a photographic coverage is set to at least one of a front and a rear of a screen of the display, the exposure controller comprising:
    exposure detecting means for generating exposure detection information indicating a mean magnitude of a video signal generated by the electronic camera for a single photographic image in response to the video signal;
    exposure adjusting means for adjusting the exposure of the electronic camera according to the exposure detection information generated by the exposure detecting means;
    a noise removing circuit for removing noise from the video signal generated by the electronic camera; and
    photographic coverage detecting means that outputs a coverage detection signal when the photographic coverage of the electronic camera is set to the rear of the screen,
    wherein the exposure detecting means virtually divides the single photographic image using a first pattern and a second pattern to generate first exposure detection information in the first pattern in which the photographic image is divided into an upper area and a lower area, the first exposure detection information indicating that a magnitude of the video signal corresponding to the lower area is more strongly reflected, and to generate second exposure detection information in the second pattern in which the photographic image is divided into a central area and a surrounding area, the second exposure detection information indicating that the magnitude of the video signal corresponding to the central area is more strongly reflected, and
    the exposure adjusting means adjusts the exposure of the electronic camera according to the first exposure detection information when the photographic coverage detecting means outputs the coverage detection signal and according to the second exposure detection information when the photographic coverage detecting means does not output the coverage detection signal.

* * * * *

UNITED STATES PATENT AND TRADEMARK OFFICE
CERTIFICATE OF CORRECTION

PATENT NO. : 7,411,616 B2  
APPLICATION NO. : 11/102153  
DATED : August 12, 2008  
INVENTOR(S) : Shuji Shimizu Page 1 of 1

It is certified that error appears in the above-identified patent and that said Letters Patent is hereby corrected as shown below:

On the Title Page, After Item (*) Notice, Should read

This Patent is subject to a Terminal disclaimer.

Signed and Sealed this  
Seventh Day of June, 2011

David J. Kappos  
*Director of the United States Patent and Trademark Office*